Aug. 30, 1949.    H. ST. PIERRE    2,480,788
CHAIN LINK
Filed May 18, 1944    2 Sheets-Sheet 1

INVENTOR.
HENRY ST PIERRE
BY Charles R. Fay,
atty.

Aug. 30, 1949.     H. ST. PIERRE     2,480,788
CHAIN LINK

Filed May 18, 1944     2 Sheets-Sheet 2

INVENTOR.
HENRY ST PIERRE
BY Charles R. Fay,
atty.

Patented Aug. 30, 1949

2,480,788

UNITED STATES PATENT OFFICE 2,480,788

CHAIN LINK

Henry St. Pierre, Worcester, Mass.

Application May 18, 1944, Serial No. 536,083

4 Claims. (Cl. 59—85)

This invention relates to a new and improved method of making chain and joiner links therefor.

Objects of the invention include the provision of a novel chain and method of making the same, in which joiner links alternate in the chain with solid links, and the joiner links, after assembly with the solid links, are welded to complete the said joiner links, thus completing the chain. Further operations may be utilized such as coining and reforging, normalizing, and heat treatment for the purpose of improving the metal characteristics both of the link blanks and of the welds; the objects of the invention also include the provision of joiner links as above stated which are welded by the application of molten metal in a direction parallel to the general plane of the link whether by electric welding or otherwise.

Further objects of the invention include the provision of a joiner link of a chain in which the joiner link is formed with a solid side and integral end elements slightly spaced to form a split side, one or both of said end elements being provided with projections extending toward each other, i. e., in the region of the split, said projections being offset relative to each other when the chain is assembled to form a recess which is located generally parallel to the plane of the link and which is adapted to receive the welding metal in the same direction.

Other objects and advantages of the invention will appear hereinafter.

Reference is to be had to the accompanying drawings, in which

Figure 1:
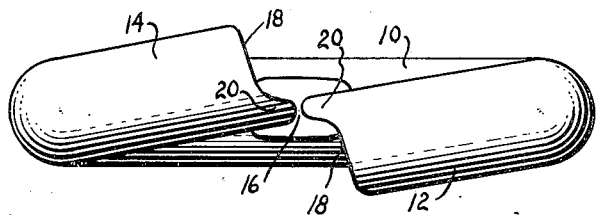
Fig. 1 is an edge view of a joiner link blank shown in its original state as it appears when forged.

The joiner link of the present invention is particularly adapted to be made by forging in dies, but it is to be understood that this blank may be made in any other way which is convenient or desired. This blank comprises a solid side 10 having end elements 12 and 14 which are separated by a split as indicated at 16. Each end element is formed with a face 18 which may assume different shapes or configurations as desired or found to be practicable, but in any case each face is formed with at least one projection 20, these projections extending toward each other and being aligned in the original blank as shown in Fig. 1. The end elements 12 and 14 are formed generally parallel to each other but at angles to the solid side 10 as clearly shown in Fig. 1, and the faces 18 provide natural draw surfaces for the dies. It will be clear that the parting line will extend parallel to solid side 10 through the center thereof and through each of the projections 20. However, it will be appreciated that the two ends 12 and 14 are not symmetrical so far as the dies are concerned since the anvil die will have a projection forming the lower surface of end 14 and a depression allowing for formation of the lower surface of end 12; and the hammer die will be similar but reversed. A stud 22 may or may not be used as desired.

Figure 2:
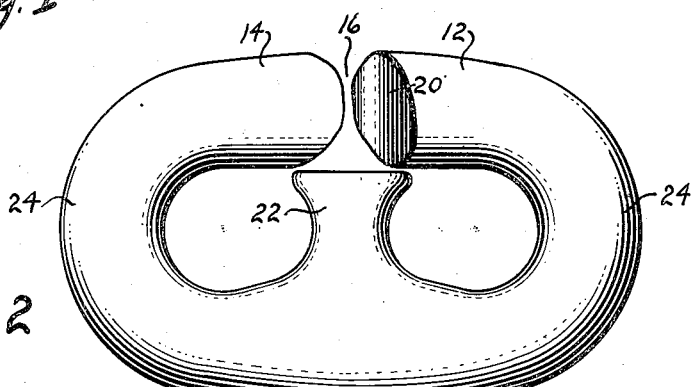
Fig. 2 is a view in side elevation of the joiner link blank of Fig. 1.

It will be observed in Fig. 2 that the ends 12 and 14 form an inverted V-shape when seen in elevation, that is, the projections 20 diverge from the outside edge at the split toward the stud. This conformation is not necessary to the invention but is preferred in the particular form of the invention illustrated.

Figure 3:
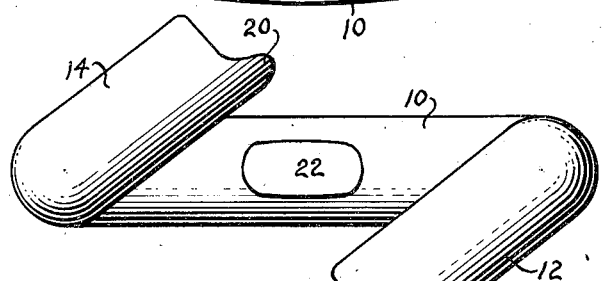
Figs. 3 and 4 illustrate the manner in which the link may be opened for the purpose of assembling solid links therewith.
Figure 4:
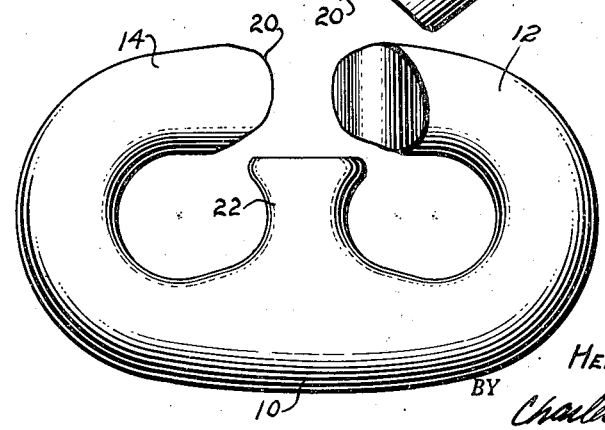
Figure 5:
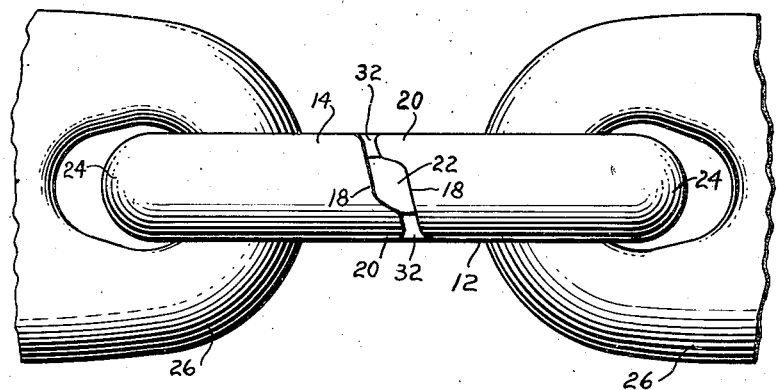
Figs. 5 and 6 show the joiner link assembled with the solid links and the end elements moved to position for welding.
Figure 6:
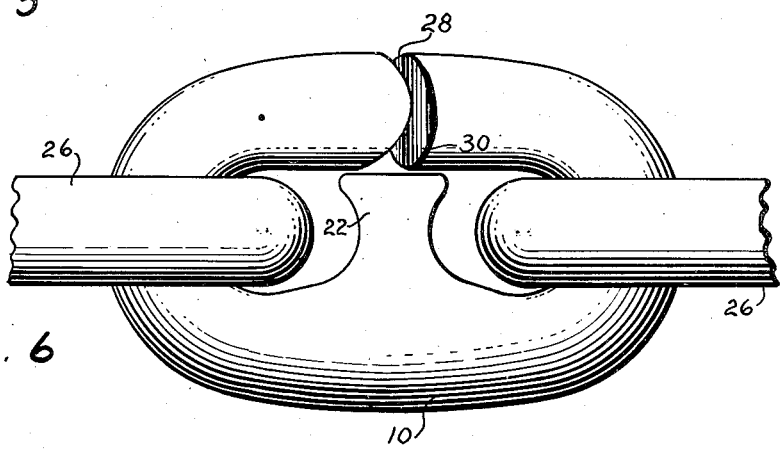
Figure 7:
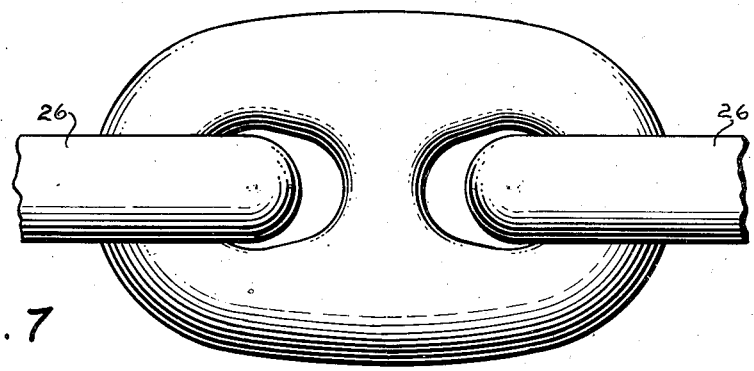
Fig. 7 is a view of the completed joiner link.

As shown in Fig. 3, the end elements 12 and 14 are twisted on axes in the link plane and lying in the ends of the blank 24 to spread the end elements and projections 20 apart for the purpose of inserting solid links 26 thereover. The end elements 12 and 14 are then swung back past the original position to a point wherein they are aligned and lie in the same plane and parallel with the solid side 10, whereupon end pressure is exerted from the ends 24 towards the stud to bring the end faces 18 closer together and the projections 20 in vertical overlapping position, see Fig. 5. This procedure, and the projection 20 construction, thus provides a recess extending from the outside edge of the split side inwardly toward the stud, and this depression is narrower at the outside edge indicated at 28 in Fig. 6 than it is at its inside edge at the region indicated by the numeral 30.

The joiner link is now in condition for welding which is done by depositing welding metal in a molten state in a direction parallel to the link plane from the exterior of the split side toward the stud and in cases where the stud is present, the latter will form a bottom for the recess and the welding metal will fuse therewith as well as with the faces 18 and projections 20. The heat required for this process will result in fusing of the weld metal not only at surfaces 18 but also at the ends of the projections 20, the surface 18 indicated in the region of the reference numeral 32. The thickness of projections 20 depends in part upon the heat used during welding operation, that is the thicker the projections the higher heat is required; and the smaller the projections the less welding heat will be used. In other words, it is well recognized that the depression or recess shown in Figs. 5 and 6 may be considerably larger than that illustrated but this fact in no way affects the scope of the invention.

After the welding operation the joiner link may be coined or restruck in dies conforming to the required final shape desired and then the chain may be heat treated for additional strength. The coining operation is done while the metal is hot and in and of itself forms a normalizing step, while the restriking will bring the grain structure of the weld into substantial uniformity with that of the rest of the link.

Having thus described my invention and the advantages thereof, I do not wish to be limited to the details herein disclosed, otherwise than as set forth in the claims, but what I claim is:

1. A blank for a joiner chain link comprising a solid side and a split side, said split side having adjacent ends, and each end having a projection extending toward the other end, one of said projections being located on one end at a position diametrically opposed to the projection on the other end and said projections forming a hollow cavity therebetween.

2. The blank of claim 1 wherein the projections are aligned, the ends being at angles to the general plane of the blank.

3. Method of making chain including the steps of forming a blank including a solid side and a pair of ends forming a split side, said ends being offset, forming offset projections on the ends, moving the ends apart, inserting at least one solid link, moving said ends back to and past original position so that the projections together form a welding cavity, and depositing welding metal in the cavity to fuse the ends together in parallel aligned condition.

4. The method of claim 3 wherein the projections are formed on both ends.

HENRY ST. PIERRE.

REFERENCES CITED

The following references are of record in the file of this patent:

UNITED STATES PATENTS

| Number | Name | Date |
| --- | --- | --- |
| 1,256,117 | Duncan | Feb. 12, 1918 |
| 1,256,118 | Duncan | Feb. 12, 1918 |
| 1,938,056 | Taylor | Dec. 5, 1933 |
| 2,260,630 | McKinnon et al. | Oct. 28, 1941 |
| 2,359,535 | Staats | Oct. 3, 1944 |

FOREIGN PATENTS

| Number | Country | Date |
| --- | --- | --- |
| 445,232 | Great Britain | Aug. 14, 1935 |